Dec. 6, 1955        F. SHORE        2,725,806
PHOTOGRAPHIC AND THE LIKE TRAYS
Filed Nov. 12, 1952        2 Sheets-Sheet 1
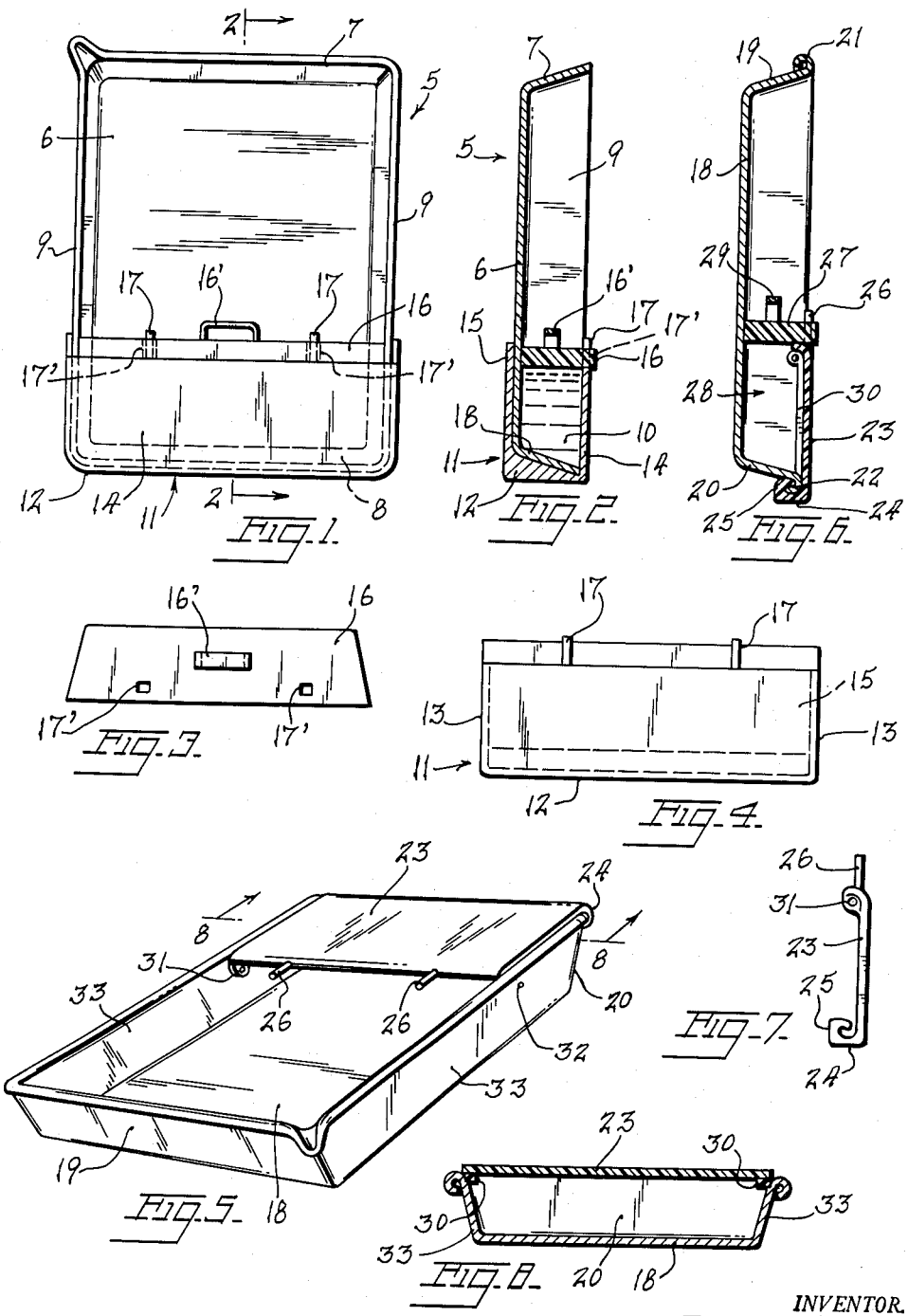
INVENTOR
FRANK SHORE
BY
ATTORNEY Dec. 6, 1955    F. SHORE    2,725,806
PHOTOGRAPHIC AND THE LIKE TRAYS
Filed Nov. 12, 1952    2 Sheets-Sheet 2
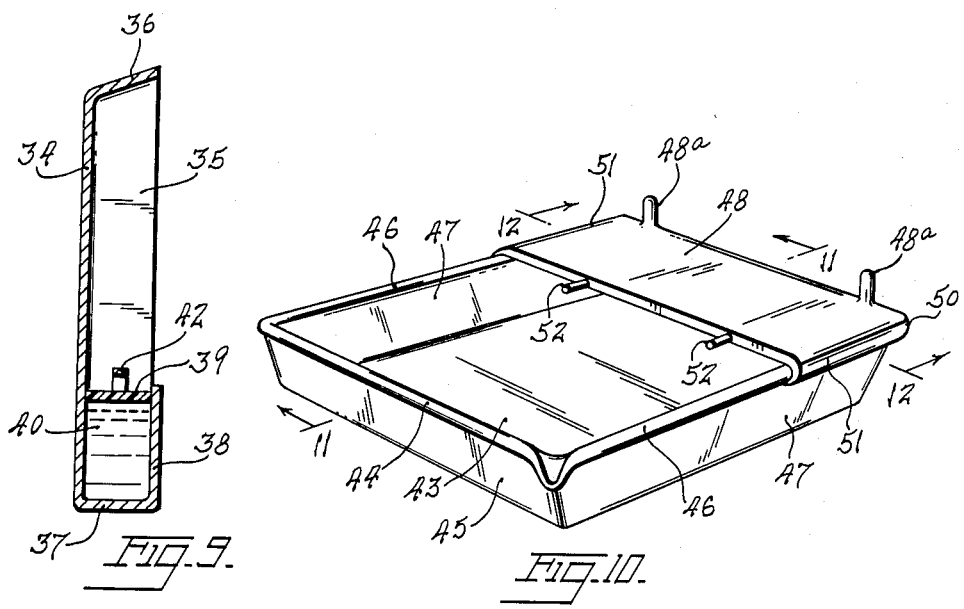
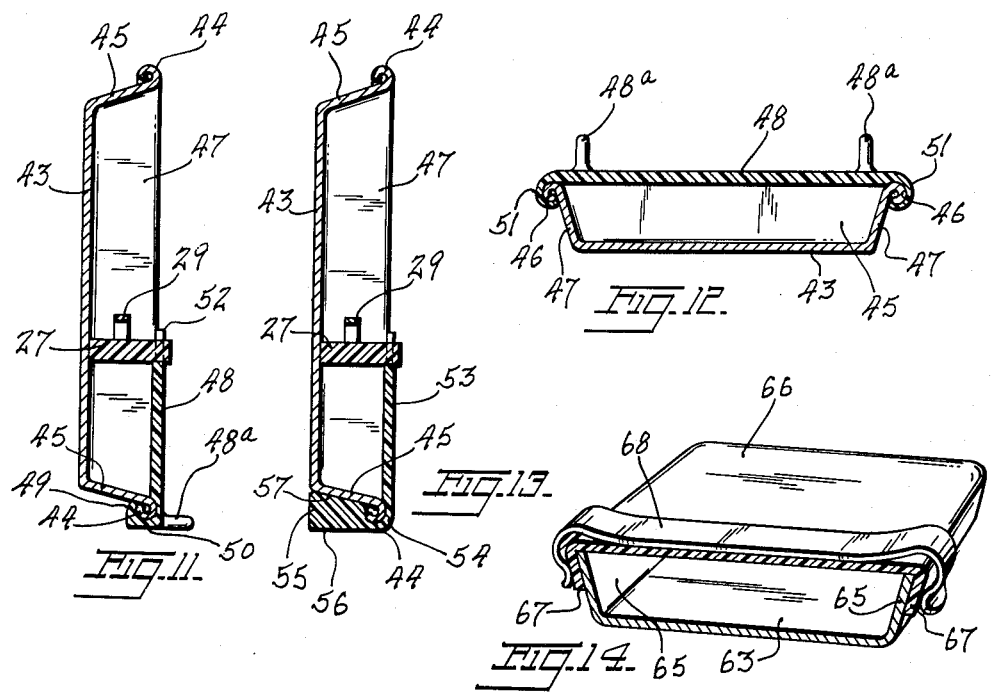
INVENTOR
FRANK SHORE
BY
Zoltan Holoschek
ATTORNEY United States Patent Office 2,725,806
Patented Dec. 6, 1955

2,725,806

PHOTOGRAPHIC AND THE LIKE TRAYS

Frank Shore, Bronx, N. Y.

Application November 12, 1952, Serial No. 319,830

5 Claims. (Cl. 95—95)

This invention relates to tank-trays and more particularly to a tray used for the processing of photographic units or articles such as films, plates, prints and the like.

In such processing of photographic units, the processing bath is contained in a shallow pan or tray open to the atmosphere, and after the processing operation it is the practice to allow the bath to remain in the pan for future use which often is after a considerable lapse of time. This is objectionable as the processing bath oxidizes in direct proportion to the square area it is exposed to the atmosphere and depth or amount of solution in the tray. It is also objectionable as the processing bath evaporates and crystallizes on the surface of the pan.

It is the prime object of the present invention to provide a cover or jacket for existing trays or pans of this type which permits the pan with the processing bath in it to be stored away for future use and at the same time protecting the bath from oxidation and contamination.

Another object of the invention is to provide a cover for a photographic processing pan which is readily mounted on and demounted from the pan, and will eliminate the need for bottles or jars for storing the solution without spilling or spoiling the strength of the same due to exposure to the atmosphere, thereby causing aerial oxidation.

A further object is to provide a shallow photographic processing pan with means for permitting the pan with its processing bath to be supported on one end without danger of loss of the liquid.

A still further object of the invention is to provide a jacket or cover for a shallow photographic processing pan which is simple in construction, efficient in operation and reasonable in cost to manufacture, which permits the tilting of the jacketed tank-tray to be tilted to one side for storage and which may be readily tilted back to normal position for immediate use.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of a photographic processing pan standing on one end and embodying one form of the invention.

Fig. 2 is a vertical sectional view taken on the plane of the line 2—2 of Fig. 1.

Fig. 3 is a top plan view of the removable cover or plug.

Fig. 4 is a front elevational view of the slip-over jacket device.

Fig. 5 is a perspective view of a photographic processing pan embodying a modified form of the invention, without the removable cover or plug.

Fig. 6 is a longitudinal sectional view of the pan of Fig. 5 standing on one end, with the removable cover in place.

Fig. 7 is an end elevational view of the hinged cover of Fig. 5.

Fig. 8 is a cross-sectional view taken on the plane of the line 8—8 of Fig. 5.

Fig. 9 is a vertical sectional view of a photographic processing pan standing on one end and embodying another modified form of the invention.

Fig. 10 is a perspective view of a photographic processing pan embodying yet another modification of the invention, without the removable cover.

Fig. 11 is a vertical sectional view taken on the plane of the line 11—11 of Fig. 10.

Fig. 12 is a cross-sectional view taken on the plane of the line 12—12 of Fig. 10.

Fig. 13 is a vertical sectional view of a further modified form of the invention.

Fig. 14 is a fragmentary perspective view of the pan showing another securing means over the removable cover.

Referring particularly to Figs. 1 to 4, inclusive, a shallow metal pan 5, rectangular in plan, of usual construction for use in processing photographic articles, such as films, plates, prints and the like, has a bottom 6, slanting end walls 7 and 8 and side walls 9 and an open top. The pan is shaped to contain a processing bath 10, and in use is supported on its bottom 6 in the usual way.

According to the invention, a slip-over jacket device 11 is provided for slipping over one end of the pan. The jacket device is rectangular in plan having a bottom 12, side walls 13, a front wall 14 and rear wall 15, with its top open. Its shape in cross-section conforms substantially to the cross-section of the pan, and is about half the length of the pan. The inner surface of the bottom 12 is slanted to conform to the slanting surface of the end wall 8 of the pan and the outer surface of the bottom 12 is flat so that the pan with its jacket can stand on end on a support.

The open top or outer end of the jacket device is slipped over one end of the pan, for example, the end 8 until its bottom 12 contacts the end of the pan when the front wall 14 of the jacket will close the bottom half of the pan as shown in Fig. 2. The jacket device and pan with its processing bath 10 therein may be raised and stood on end. When this is done, the bath 10 flows to the bottom half of the pan and is contained in the compartment 15 formed by the bottom and end walls of the pan and the front wall of the jacket device. The pan and jacket device are supported in balanced condition by the flat bottom wall 12 of the jacket device.

In order to seal off the top of the compartment 15, an elongated plastic floating plug or cover 16, similar in shape to the contour of the cross-section of the compartment, is fitted into the top of the compartment above the bath 10. The cover 16 is guided to its sealing position and held in position by spaced lugs 17 extending upwardly from the top edge of the front wall 14 of the jacket device and through openings 17' near the front edge of the cover. When the cover 16 is in position, the bath 10 is protected from the atmosphere and whereby the bath lasts longer, and aerial oxidation is considerably lessened. The cover 16 may have a handle 16' and may also be used as a squeegee.

Then the jacket device 11 and cover 16 are in position on the pan, the pan with its contents may be stored away in upright standing position on a supporting shelf or the like thereby taking up a minimum of space and the tray will support itself.

In the modification of the invention shown in Figs. 5, 6 and 7, the pan 18 has end walls 19 and 20, with curled rims 21 and 22, respectively. A plate member 23 of a size adapted to cover approximately the bottom half of the pan is hingedly connected to one end of the pan, for example, end 20. This connection comprises a straight peripheral flange 24, formed integrally with and along one end of the plate member and continuing into a curled rim or edge 25. The curled rim 25 is hooked around the curled rim 21 of the end 19 of the pan. The opposite free end of the plate member is formed with spaced integral lugs 26 extending upwardly therefrom. A plug or cover 27 similar in construction to cover 16 is mounted on the lugs 26 and serves to seal off the compartment 28 formed by the bottom and side walls of the pan and the plate member 23. A handle 29 is formed on the upper surface of the cover 27 for manipulating the cover.

A rubber gasket or lining 30 may be interposed between the edges of the plate member 23 and the walls of the pan to make the pan leakproof. The plate member may also be provided with a nipple 31 on each side edge of its free end for snapping into a depression 32 formed on the inner surface of the adjacent side wall 33 of the pan, to hold the plate in position.

In this form, the flat outer surface of the flange 24 of the plate member 23 affords sufficient supporting area to permit the pan to be supported on end as shown in Fig. 6.

The modified form of pan of Fig. 9 comprises a bottom 34, side walls 35, a slanting end wall 36 and straight end wall 37. The end wall 37 continues into an integral, inwardly extending top wall 38. The top wall covers approximately one-half the area of the pan. A cover 39 is free to float on top of the solution and seals off the outer end of the compartment 40 provided by the bottom, side and top walls.

A handle 42 is provided on the top of the cover. The pan may stand on the straight or flat end wall 37 for storage purposes.

Figs. 10, 11 and 12 illustrate a modified form of the invention in which the pan 43 has a curled rim 44 on the periphery of each end wall 45 and a curled rim 46 on the periphery of each side wall 47. A plate member 48 of thick rubber or transparent plastic material is formed at one end with an integral extension of thin rubber or stretchable plastic sheet, which is curled to provide a curled rim 49 having a flat outer surface portion 50 and grip handles 48ª which will also serve as supporting legs when the tray is stored in upright standing position. Each side of the plate member has a similar extension providing curled rims 51. The end of the plate member opposite the curled rim 49 is formed with spaced integral guide lugs 52 extending outwardly therefrom.

The plate member is mounted on the pan by sliding the side rims 51 along the curled side rims 46 of the side walls 47 of the pan until the rim 49 overlaps the rim of the adjacent end wall 45 of the pan. The plate member when in this overlapping relation seals the pan against leakage of liquid.

In all other respects, the form of Figs. 10 to 12, inclusive, is the same as the form of Figs. 5 to 7, inclusive, and like numerals are used for like parts.

In the modification of the invention illustrated in Fig. 13, the plate member has a thick body portion 53 and a thin curled extension 54 along only one end thereof. The curled extension 54 continues into an enlarged skirt portion 55 extending at a right angle to the body portion 53. The skirt portion has a plane outer surface 56 and a slanting inner surface 57 adapted to contact the slanting outer surface of the adjacent end wall 45 of the pan. The plane surface 56 of the skirt portion serves as a seat for the pan and plate member when in upright position, and the curled extension 54 and the skirt portion serve to seal the pan against leakage of liquid.

In all other respects, the form of Fig. 13 is similar to that of Figs. 5 to 7, inclusive, and like numerals are used to designate like parts.

In Fig. 14, the pan 63 is shown with straight edge side walls 65 and the plate member 66 which is made of plastic or rubber sheet and its bent down edges 67 may be held in position by one or more spring clamps 68.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A pan of the kind described comprising bottom, side and end walls and an open top, a removable jacket device fitted over one end wall of said pan and with the bottom, end and side walls forming a compartment, said jacket device including a front wall, spaced lugs extending upwardly from the top edge of said front wall, and a cover removably mounted on said spaced lugs for sealing off the outer end of said compartment, said jacket device having a flat wall portion for supporting the pan and jacket device on end.

2. A photographing processing pan comprising a body having bottom, side and end walls and an open top, curled rims on the end walls, a plate member having one end hinged to one of said curled rims and with the bottom, side and end walls of the pan forming a compartment, spaced lugs on the end of said plate member opposite its hinged end, and a cover removably mounted on said lugs for sealing off the compartment, the hinged end of said plate member having a flat surface for supporting the jacket device and pan on end.

3. A photographic processing pan comprising a body having bottom, side and end walls and an open top, curled rims on the end walls, a plate member having one end hinged to one of said curled rims and with the bottom, side and end walls forming a compartment, spaced lugs on the end of said plate member opposite its hinged end, a cover removably mounted on said lugs at the top of said compartment for sealing off said compartment, and a gasket interposed between the edges of said plate member and the side walls of the pan for preventing leakage, the hinged end of said plate member having a flat surface for supporting the jacket device and pan on end.

4. A photographic processing pan comprising a body having bottom, side and end walls and an open top, curled rims on the end walls, said side walls having depressions on their inner surfaces, a plate member having one end hinged to one of said curled rims and with the bottom, side and end walls of the pan forming a compartment, spaced lugs on the end of said plate member opposite its hinged end, a cover removably mounted on said lugs for sealing off the compartment, nipples on the end edges of the plate member adapted to snap into the depressions on the side walls of the pan for holding the plate member in position, the hinged end of said plate member having a flat surface for supporting the jacket device and pan on end.

5. A pan of the kind described comprising bottom, side and end walls and an open top, a removable jacket device fitted over one end wall of said pan and with the bottom, end and side walls forming a compartment, said jacket device including a front wall, a cover removably mounted on the top edge of said front wall for sealing off the outer end of said compartment, said jacket device having a flat wall portion for supporting the pan and jacket device on end, and means for interlocking the top edge of the front wall and the cover.

References Cited in the file of this patent

UNITED STATES PATENTS

| | | |
|---|---|---|
| 337,547 | Atkinson | Mar. 9, 1886 |
| 670,165 | Sheppard | Mar. 19, 1901 |
| 786,266 | Cartwell | Apr. 4, 1905 |
| 1,103,076 | Quidas | July 14, 1914 |
| 1,125,092 | Quidas | Jan. 19, 1915 |

FOREIGN PATENTS

| | | |
|---|---|---|
| 622 | Great Britain | Mar. 8, 1871 |